United States Patent
Efrati (10) Patent No.: US 11,936,272 B2
(45) Date of Patent: Mar. 19, 2024

(54) SLIM PROFILE HAPTIC TRANSDUCER ARRAY

(71) Applicant: Woojer LTD., Elad (IL)

(72) Inventor: Mor Efrati, Givat Yishayahu (IL)

(73) Assignee: WOOJER LTD., Elad (IL)

( * ) Notice: Subject to any disclaimer, the term of this patent is extended or adjusted under 35 U.S.C. 154(b) by 195 days.

(21) Appl. No.: 16/082,068

(22) PCT Filed: Feb. 5, 2017

(86) PCT No.: PCT/IL2017/050134
§ 371 (c)(1),
(2) Date: Sep. 4, 2018

(87) PCT Pub. No.: WO2017/158582
PCT Pub. Date: Sep. 21, 2017

(65) Prior Publication Data
US 2020/0313536 A1    Oct. 1, 2020

Related U.S. Application Data (60) Provisional application No. 62/310,137, filed on Mar. 18, 2016.

(51) Int. Cl.
| | |
|---|---|
| H02K 41/03 | (2006.01) |
| H02K 1/34 | (2006.01) |
| H02K 33/00 | (2006.01) |
| H02K 35/02 | (2006.01) |

(52) U.S. Cl.
CPC .............. *H02K 41/031* (2013.01); *H02K 1/34* (2013.01); *H02K 33/00* (2013.01); *H02K 35/02* (2013.01)

(58) Field of Classification Search
CPC ........ H02K 1/34; H02K 35/02; H02K 7/1876; H02K 7/1892
USPC .................................................. 310/12, 15–39
See application file for complete search history.

(56) References Cited

U.S. PATENT DOCUMENTS

| | | | | |
|---|---|---|---|---|
| 4,909,379 A | * | 3/1990 | Albeck .................. | B65G 27/08 198/757 |
| 6,217,508 B1 | | 4/2001 | Ball et al. | |
| 8,682,396 B2 | * | 3/2014 | Yang ....................... | H04M 1/00 455/567 |
| 2013/0193779 A1 | * | 8/2013 | Kuroda .................. | H02K 33/16 310/15 |
| 2014/0321681 A1 | | 10/2014 | Ball et al. | |
| 2017/0222532 A1 | * | 8/2017 | Wang ..................... | H02K 33/16 |
| 2019/0070635 A1 | * | 3/2019 | Takeda .................... | B06B 1/045 |

FOREIGN PATENT DOCUMENTS

| | | | | |
|---|---|---|---|---|
| EP | 3002958 | | 4/2016 | |
| WO | WO 2006028165 | | 3/2006 | |
| WO | WO-2006028165 A1 | * | 3/2006 | ............ B06B 1/045 |

\* cited by examiner

*Primary Examiner* — Ahmed Elnakib
*Assistant Examiner* — Minki Chang
(74) *Attorney, Agent, or Firm* — Robert G. Lev (57) ABSTRACT

A haptic transducer comprising a magnetic plate, a plurality of coils each separately couplable to a signal generator such that axis of each coil is perpendicular to the plate and all coils are on a common side of the plate, and signals may be sent from said signal generator to each coil individually.

11 Claims, 7 Drawing Sheets

SLIM PROFILE HAPTIC TRANSDUCER ARRAY

PRIORITY INFORMATION

The present application is a National Stage Entry of PCT/IL2017/050134, filed on Feb. 5, 2017, and claims priority from U.S. Provisional Patent App. No. 62/310,137, filed on Mar. 13, 2016.

BACKGROUND

The Faraday Effect shows how an electric current in a perpendicular magnetic field experiences a thrust in a third tangential direction. This is known as the Faraday Motor Effect. Similarly, movement of a wire within a magnetic field induces a current flow in what is known as the dynamo affect. Where the electrical conduit or wire is coiled, the effects are multiplied as each segment of the coil that is perpendicular to the magnetic field causes or experiences the thrust.

There are a number of transducers that comprise arrangements of coils and magnets that utilize this effect. Some create vibrations in response to current fluctuations in the coil and others convert physical movement into electronic signals.

Essentially the same arrangement can be used for either purpose.

All physical bodies have natural frequencies of vibration and at these frequencies, harmonic motion is created and wide amplitude vibrations are generated. Dependent on the design of the component magnets, coils and housing, transducers may be designed to vibrate at vibrate significantly at specific desired frequencies or frequency ranges of applied electronic signals, or to generate significant electronic signals by vibrations of desired frequencies or frequency ranges.

Where asymmetrical low frequency signals are applied to a coil of such a transducer, a directional tug may be induced in the magnet and felt by someone contacting the magnet and the surrounding casing. This phenomenon is known as forced feedback.

In 1994, Aura Systems launched the Interactor Vest, a wearable force-feedback device that monitors an audio signal and uses electromagnetic actuator technology to convert bass sound waves into vibrations that can represent such actions as a punch or kick. The Interactor vest plugs into the audio output of a stereo, TV, or VCR and the user is provided with controls that allow for adjusting of the intensity of vibration and filtering out of high frequency sounds. The Interactor Vest is worn over the upper torso and the audio signal is reproduced through a speaker embedded in the vest. After selling 400,000 of its Interactor Vest, Aura began shipping the Interactor Cushion, a device which operates like the Vest but instead of being worn, it's placed against a seat back and the user must lean against it.

U.S. Pat. No. 8,995,692 to Mor Efrati describes a number of transducers comprising various arrangements of coils and magnets that provide bass frequency and infra-sound vibrations that can be worn on the body and enhance the sensations of the wearer. A bass vibrator can be worn together with earphones and will provide a more realistic music experience to the wearer than one wearing earphones alone, since earphones do not effectively reproduce the low frequency notes.

Very low frequency vibrations or infra-sound may not be audibly detected by someone, but they cause a feeling of trepidation that may be associated with fear of the unknown, spookiness, and the like. It has been theorized that it is the non-audible low frequency vibrations in a lion's roar that creates panic.

SUMMARY OF THE INVENTION

A first aspect is directed to providing a haptic transducer comprising a magnetic plate, a plurality of coils arranged around the edge of the magnetic plate, such that axis of each coil is in plane with the plate; each coil being separately couplable to a signal generator, the plate being suspended from springy supports anchored to a frame surrounding the coils and the plate in the plane of the plate.

Optionally, the haptic transducer comprises four coils around the magnetic plate and the magnetic plate is suspended by four wires each coupled to a corner of the frame.

Optionally, there are four coils around the magnetic plate and the magnetic plate is suspended by four wires each coupled to a corner of the frame.

Optionally, the haptic transducer comprises four coils and the magnetic plate is coupled to the frame by a plurality of Y shaped double clips, such that as the magnetic plate moves towards or away from a corner in the line of a pair of coiled springs, an effective length of the Y shape double clip is self-adjusted.

Optionally, the haptic transducer of claim 1 further comprising one or two further coils perpendicular to the plane of the four coils.

Typically, the coils are helical coils.

Typically, one surface of the magnetic plate is north seeking and the opposite surface south seeking.

Alternatively, one end is north seeking and the opposite end is south seeking.

Typically, the coils are coupled to the frame and the magnetic plate is independently adhered to an opposite side of the housing coupled to the frame.

Optionally, the frame comprises a material selected from the group comprising aluminum, copper, wood, cardboard, plastic, fiber reinforced polymer and spring steel.

A second embodiment is directed to an array of magnetic plates comprising adjacent staggered rows of alternating coils and magnets coupled by coils, so that each magnetic plate is surrounded by four coils and each magnetic coil is sandwiched between two magnetic plates wherein each coil is separately connected to a signal processor such that signals may be transmitted to each and any coil separately.

Optionally, each magnetic plate is further coupled to one or two frame elements that are out of the plane of the array, providing three dimensional support.

BRIEF DESCRIPTION OF FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF EMBODIMENTS

The present invention is directed to providing a transducer that can be used for either generating electronic signals in response to physical movement or generating physical movement in response to electronic signals supplied thereto. The transducer is characterized by having a slim profile, making it particularly suitable for a wide variety of uses such as inclusion in smart phones.

Figure 1:
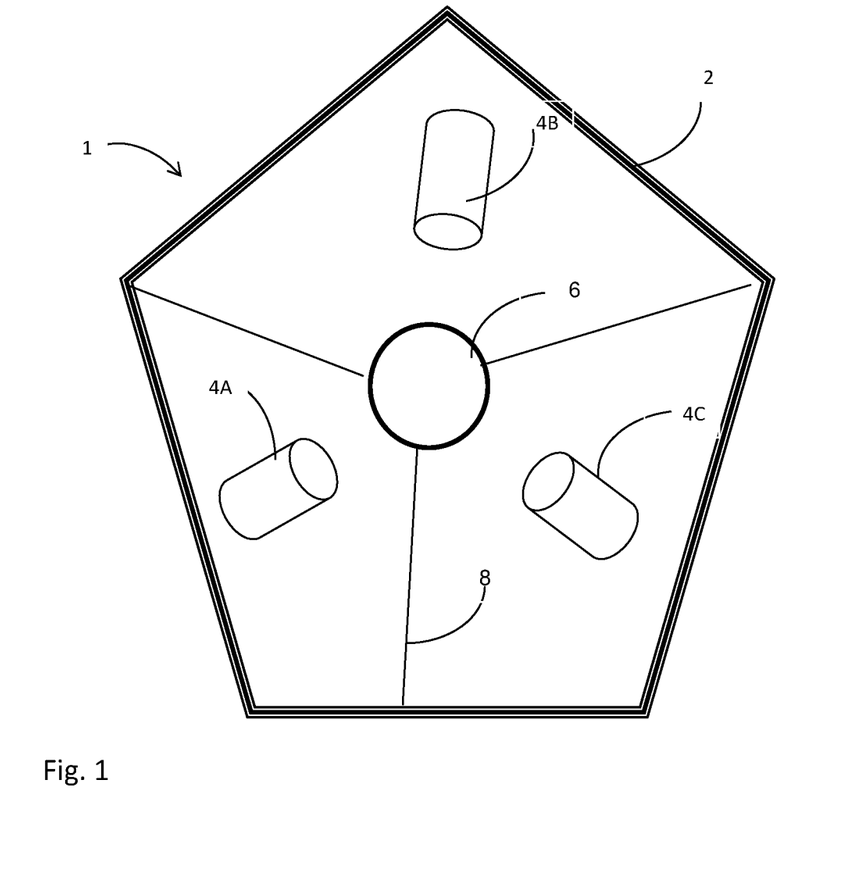
FIG. 1 is a haptic transducer in accordance with one embodiment of the invention.

With reference to FIG. 1, a transducer 1, consisting of a frame 2, that is shown as being pentagonal, but could be triangular, circular, rectangular or other shape is shown. A plurality of coils 4A, 4B and 4C are shown in a planar but non-linear arrangement, preferably but not necessarily symmetrically arranged, about a magnet 6 that is suspended from cords or wires 8 that are attached to the frame 2. The coils 4A, 4B and 4C themselves are fixed with respect to the frame 2. Electronic signals may be sent to any or all of the coils 4A, 4B, 4C individually. These signals induce magnetic fields that cause the magnet 8 to move within or out of the plane of the frame 2. The resultant tug enables such signals to be experienced haptically. The wires 8 and/or the frame 2 have to have sufficient elasticity to enable the magnet to move with respect to the coils.

Figure 2:
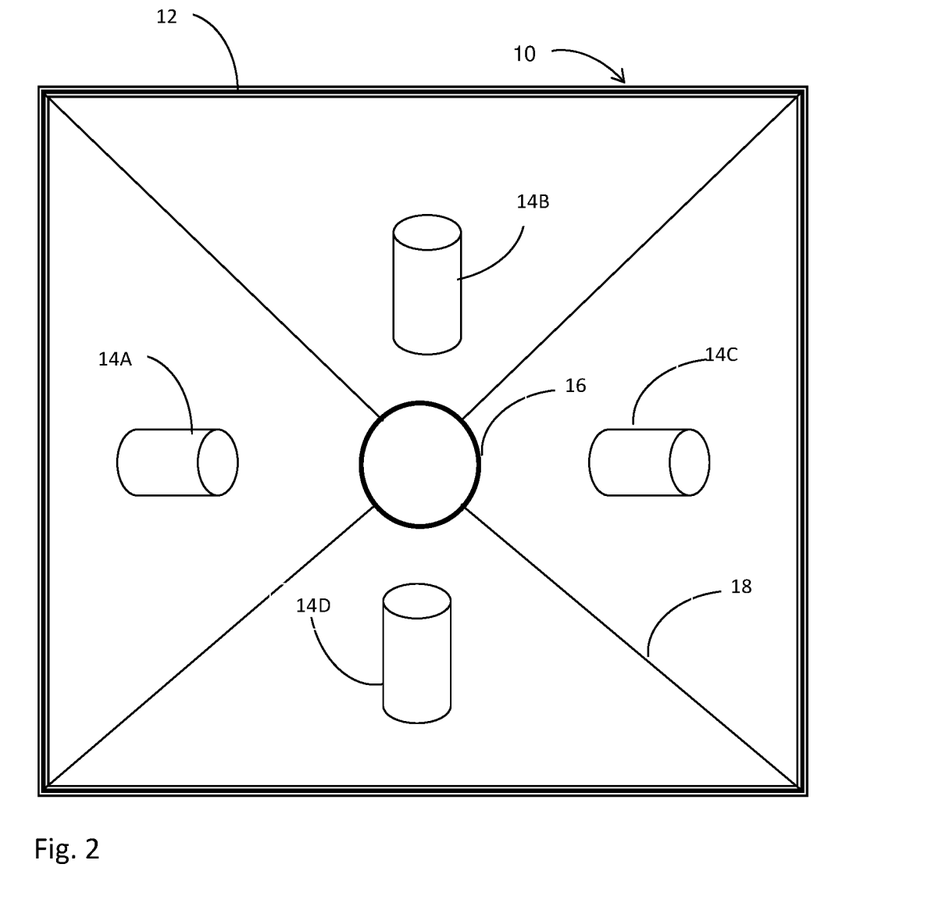
FIG. 2 is a schematic illustration plane view of a transducer in accordance with a second embodiment of the invention.

With reference to FIG. 2, a schematic illustration plane view of a transducer 10 in accordance with a second embodiment of the invention is shown. Here the frame 12 is rectangular, and four coils 14A, 14B, 14C, 14D are provides around the magnet 16. As shown, the four coils 14A, 14B, 14C, 14D are arranged in a cross formation around the magnet 16. This is not strictly necessary, as long as they are not collinear, the magnet 16 can be tugged in any way desired, within or out of the plane, by signals provided to selected coils. The magnet is anchored by wires 18 to the frame 12. The wires 18 are required to be fairly stiff, but to have a degree of elasticity.

Figure 3:
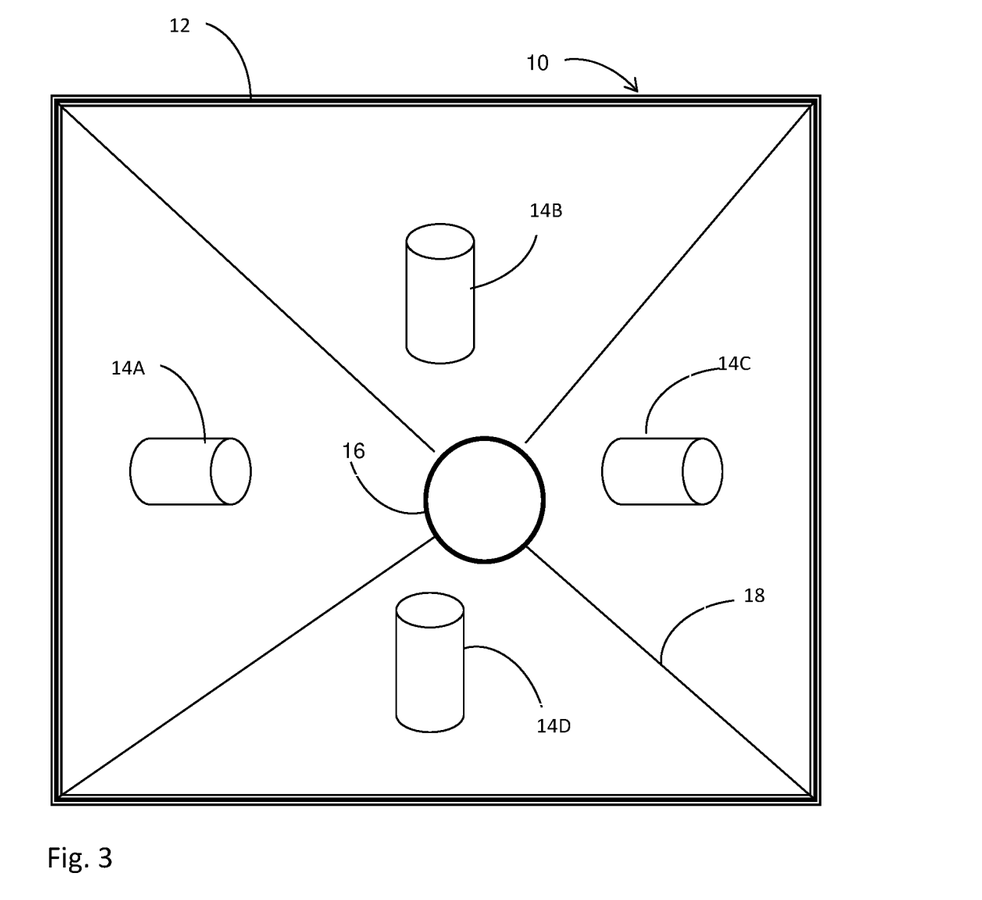
FIG. 3 is a schematic illustration plane view of the transducer in of FIG. 2 wherein electronic signals sent to the coils induce magnetic forces that displace the magnet.

FIG. 3 is a schematic illustration plane view of the transducer in of FIG. 2 wherein electronic signals sent to the coils 14A, 14B, 14C, 14D induce magnetic forces that displace the magnet 16 which is shown off center. The amount of displacement allowed will depend on the nature of the wires 18, and the schematic illustration of FIG. 3 may be exaggerated.

Figure 4:
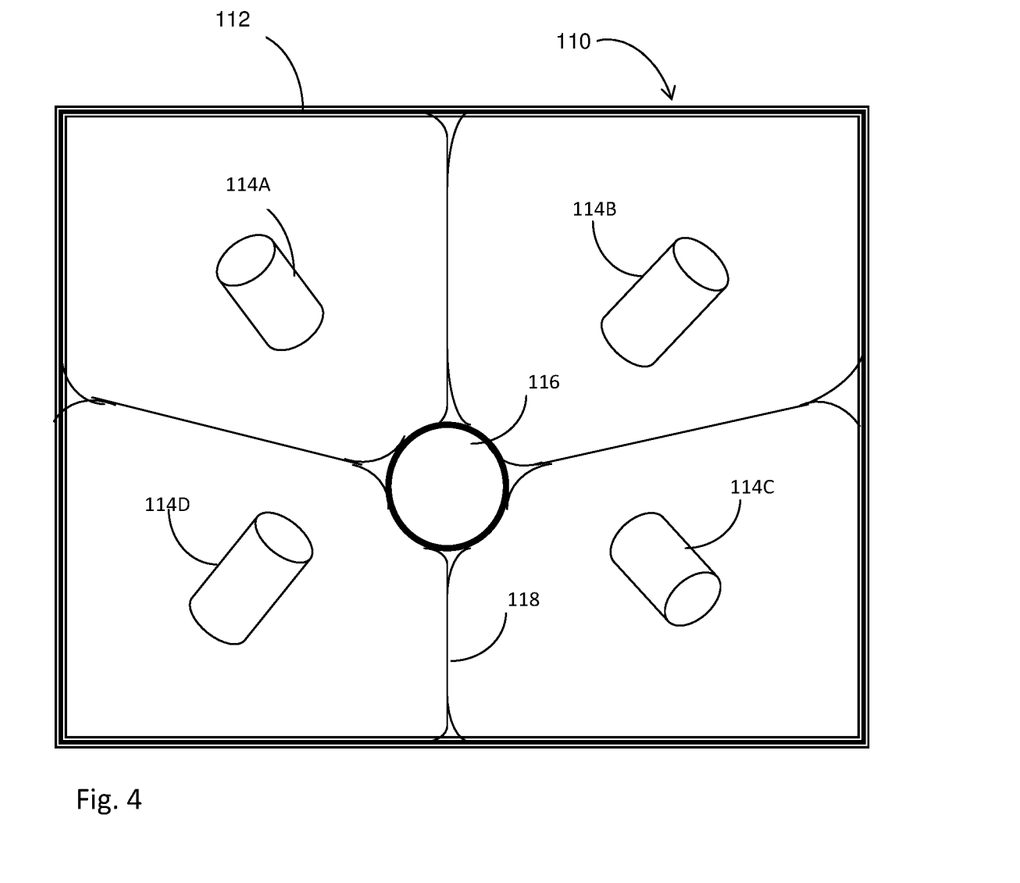
FIG. 4 is a schematic illustrational plane view of a transducer in accordance with a third embodiment of the invention wherein the magnetic plate is coupled to the surrounding frame with Y shaped spring clips.
Figure 5:
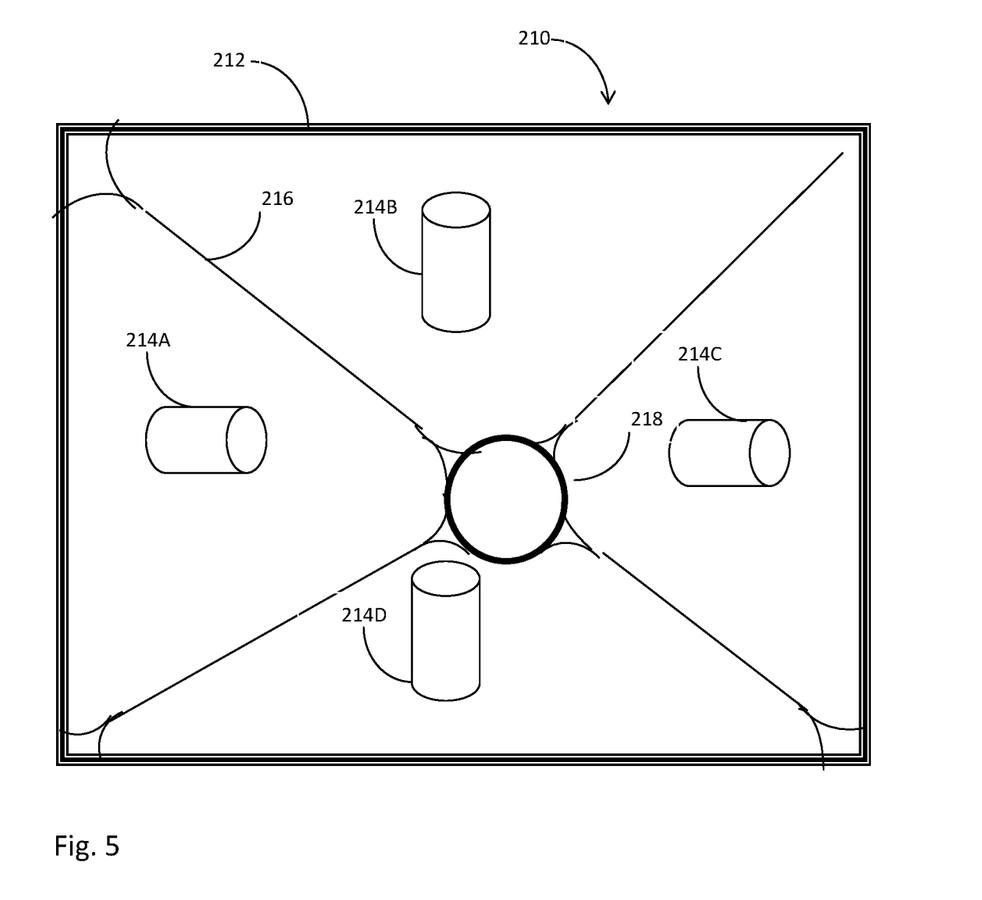
FIG. 5 is a schematic illustrational view of a transducer in accordance with the third embodiment of the invention wherein electronic signals sent to the coils induce magnetic forces that displace the magnet, showing how the Y shaped spring clips provide support but enable movement of the magnet.

With respect to FIG. 4, a schematic illustrational plane view of a transducer 110 in accordance with an embodiment of the invention is shown, wherein the frame 112 is rectangular and there are four coils 114A, 114B, 114C, 114D surrounding the magnetic plate 16, as per the embodiment of FIGS. 2 and 3, mutatis mutandis, however, instead of wires 18, the magnetic plate 116 is coupled to the surrounding frame 112 with Y shaped spring clips 118. The four coils 14A, 14B, 14C, 14D may be fabricated from spring steel and are designed to curl as forces are applied to them, enabling the magnetic plate 116 to move within the frame 112. As shown in FIG. 4, the Y shaped spring clips 118 are attached to the vertices of the frame 112. However, as shown in a schematic illustrational view of a transducer 210 in accordance with a further embodiment of the invention in FIG. 5, the Y shaped spring clips 216 may couple the magnetic plate 218 to the vertices of the frame 212, again providing support but enabling movement of the magnetic plate 218 in response to electronic signals sent to the coils 214A 214B, 214C, 214D which induce magnetic forces that displace the magnetic plate 216, showing how the Y shaped spring clips 216 provide support but enable movement of the magnet.

Figure 6:
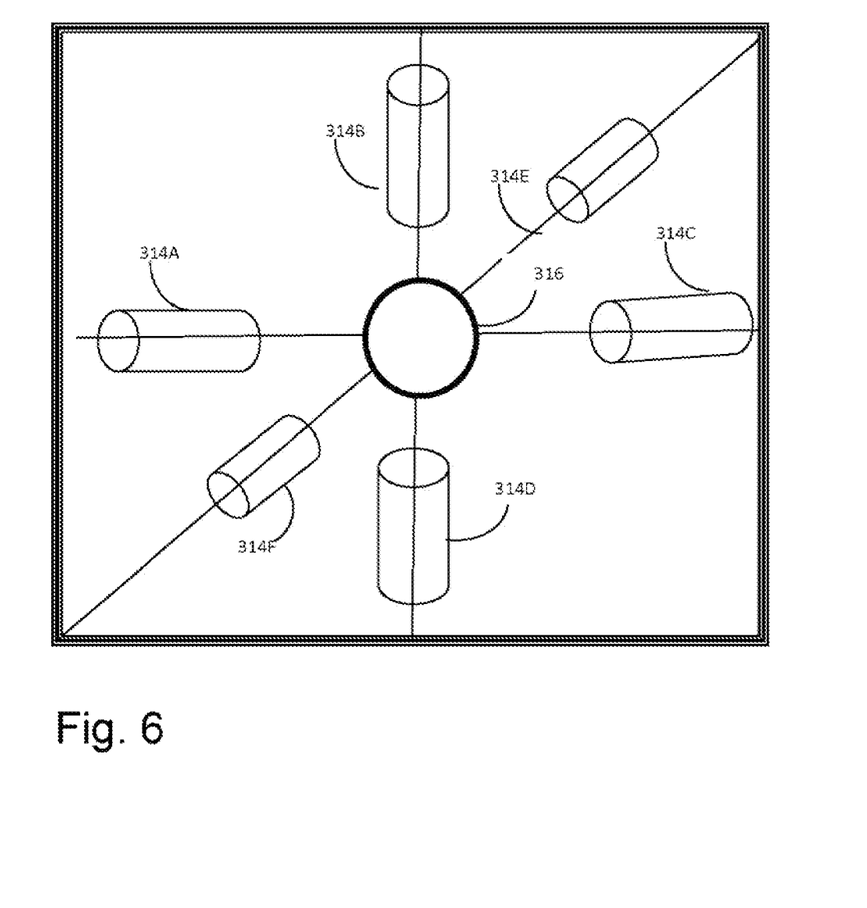
FIG. 6 shows a fourth embodiment, which is a variation of the transducer in of FIG. 2 wherein additional coils are provided above and below the magnet.

To give fuller control to movement in three dimensions, as shown in FIG. 6, a transducer 210 in accordance with yet a further embodiment, the coils 314A 314B, 3140, 314D may be supplemented by additional coils 314E and 314F that are out of the plane, arranged in the Z axis. Again, Y shaped spring clips (not shown) may be provided to support but to enable movement of the magnet.

It will be appreciated, however, that not only do perpendicular magnetic fields and electronic currents in coils interact to cause a thrust in a third orthogonal direction, but with four coils arranged tetrahedrally around magnet a 316, full three dimensional movement is allowed.

In the embodiments shown, the magnet is supported by wires or by Y shaped clips. It will be appreciated, however, that the magnet and coils may be embedded in a dielectric rigid foam, such as a polyurethane, polypropylene or expanded polystyrene foam and thereby held in their relative positions. There is, however, an advantage in using spring clips, guitar strings or piano wires for supporting the magnet, in that it more effectively transmits vibrations to the frame. If a foam is used, it need not cover the magnet on all sides, and could support it only from below, for example.

Figure 7:
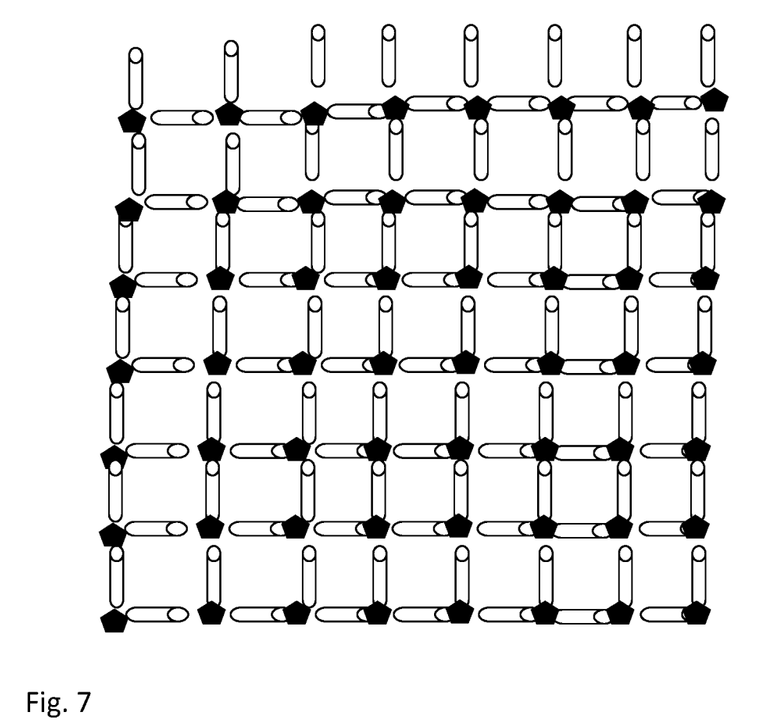
FIG. 7 is a schematic illustrational plane view of an array of transducers in accordance with a further embodiment of the invention.

FIG. 7 is a schematic illustrational plane view of an array of transducers in accordance with a further embodiment of the invention. An array of this nature creates a surface that may be crease and wrinkle to show a topography, or to provide a surface that can provide haptic effects at periodic positions, or to provide a sensation of movement, may moving a haptic effect from one node to another. Such a surface may be attached to a fabric or a garment for example.

Each coil in the array may be coupled to a signal generator or to a receiver for transmitting or receiving a unique signal. Since the induced magnetic field of a current or the current induced by a magnet in a wire drop away with the square of the distance, only the coils closest to a magnet are affected by that magnet, and only the magnet closest to a coil are affected by signals in that coil, so in a two dimensional array such as the one shown, each magnet reacts to the combined signal from the four closest coil when used to provide physical movement in response to supplied signals. When the array is used to generate signals from movement of magnets, relative movement of the two magnets at each end of a coil are able to generate signals in the coil.

Various embodiments of the present invention have been illustrated and several more have been described. It will be understood that instead of helical coils, pancake coils may be provided. The magnetic plate may be magnetized N-S through the plate or in the plane of the plate and may have any shape. Thus various modifications may be made without departing from the spirit and scope of the invention. Accordingly, other embodiments are within the scope of the following claims.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A haptic transducer comprising a magnetic plate, a plurality of coils arranged around the edge of the magnetic plate, such that a major axis of each coil is laterally aligned with the magnetic plate; each coil being separately couplable to a signal generator, the magnetic plate being suspended from elastic wires or cords anchored to a frame surrounding the coils; wherein activation of said coils laterally moves said magnetic plate.

2. The haptic transducer of claim 1, wherein there are four coils around the magnetic plate and the magnetic plate is suspended by four wires each coupled to a corner of the frame.

3. The haptic transducer of claim 1 comprising four coils and the magnetic plate is coupled to the frame by a plurality of Y shaped double clips, such that as the magnetic plate moves towards or away from a corner in the line of a pair of coiled springs, an effective length of each of the Y shape double clips is self-adjusted.

4. The haptic transducer of claim 1 further comprising one or two further coils perpendicular to the plane of the four coils.

5. The haptic transducer of claim 1 wherein said coils are helical coils.

6. The haptic transducer of claim 1 wherein the magnetic plate is a permanent magnetic disc.

7. The haptic transducer of claim 1 wherein, one surface of the magnetic plate is north seeking and an opposite surface south seeking.

8. The haptic transducer of claim 1 wherein one end is north seeking and an opposite end is south seeking.

9. The haptic transducer of claim 1 wherein the frame comprises a material selected from the group comprising aluminum, copper, wood, cardboard, plastic, fiber reinforced polymer and spring steel.

10. A system comprising a plurality of transducers according to claim 1, the transducers arranged in an array of alternating coils and magnetic plates, each magnetic plate being surrounded by four coils, wherein each coil is separately connected to a signal processor such that signals may be transmitted to each coil separately; wherein activation of said coils laterally moves said magnetic plates.

11. The array of claim 10 wherein each magnetic plate is further coupled to one or two frame elements that are out of the plane of the array, providing three dimensional support.

* * * * *